May 2, 1967  H. L. SCOTT  3,317,065
TRUCK TILTING PLATFORM HAVING RETRACTABLE BACKSTOP
Filed Aug. 21, 1964  2 Sheets-Sheet 1
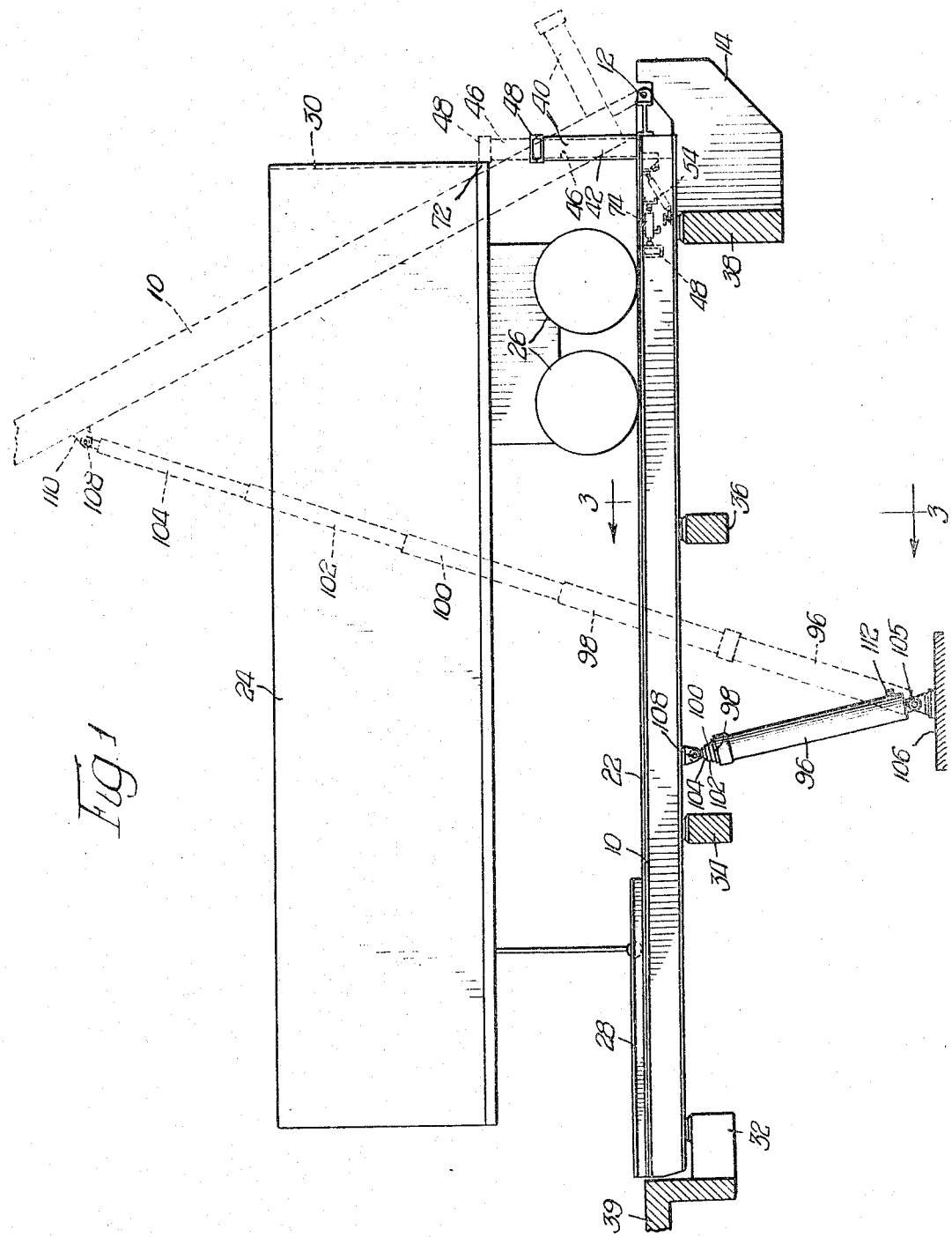
INVENTOR.
Hugh L. Scott,
BY

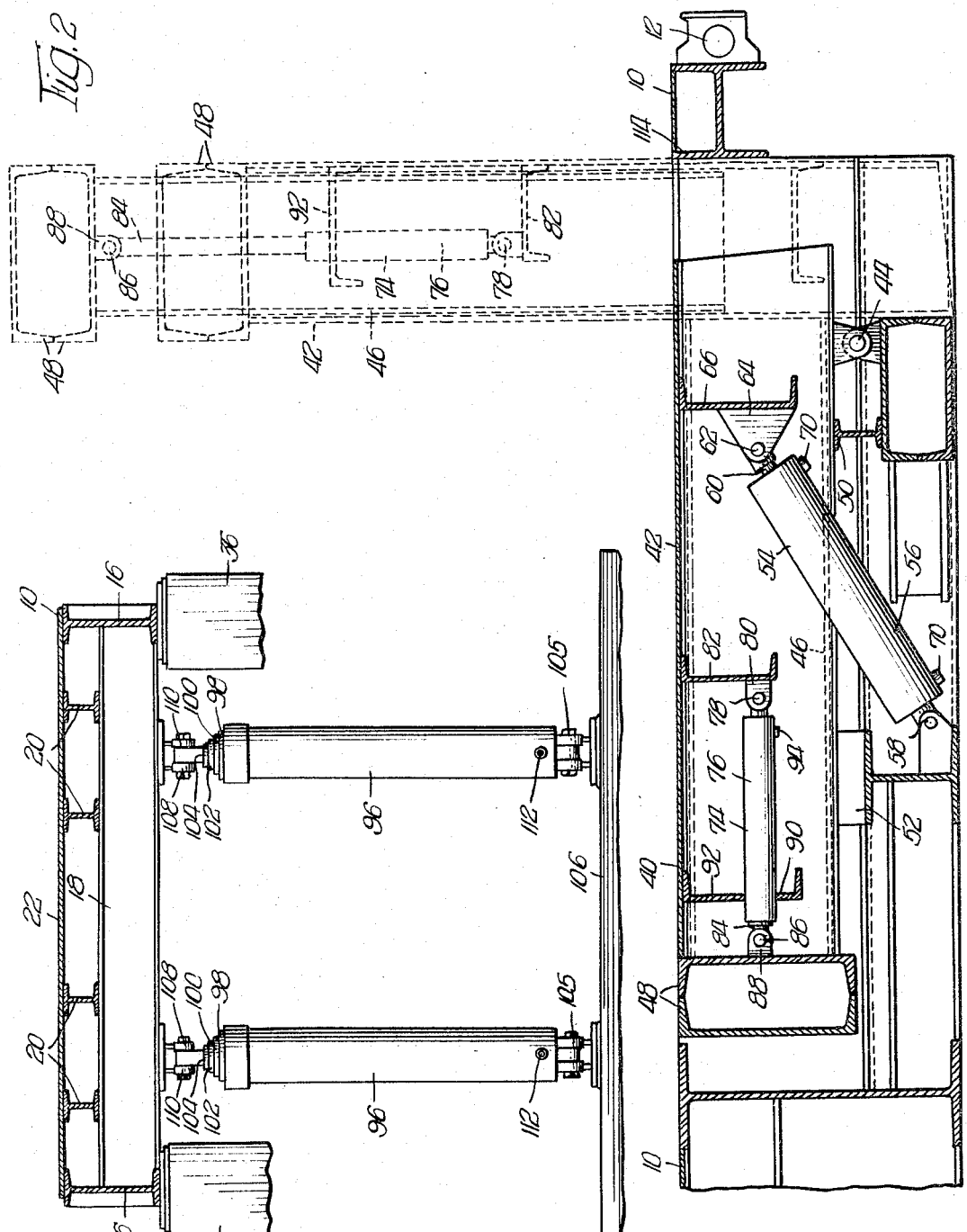

United States Patent Office 3,317,065
Patented May 2, 1967

3,317,065
TRUCK TILTING PLATFORM HAVING
RETRACTABLE BACKSTOP
Hugh L. Scott, Hammond, Ind., assignor to Screw Conveyor Corporation, a corporation of Illinois
Filed Aug. 21, 1964, Ser. No. 391,177
14 Claims. (Cl. 214—49)

This invention relates to truck unloaders, and is more particularly concerned with an improved backstop which is adjustable to provide the desired cooperation with the desired portion of the back of the truck which will vary in different trucks.

One of the objects of the present invention is to provide a backstop which is pivoted to the frame of the truck supporting platform of the truck unloader and has a horizontal position within the frame of the truck supporting platform, and wherein there is means for swinging the backstop to a vertical upright position extending upwardly from the platform and for raising and lowering the upper end of the backstop for proper cooperation with the back of the truck.

Another object is to provide a truck supporting platform having stop means for stopping the backstop in its upright position as it is swung to that position by the means for swinging the backstop to its vertical upright position.

Another object is to provide a backstop which is swung from its horizontal position within the frame of the truck supporting platform to a vertical position by a hydraulic cylinder and piston structure, and wherein in the vertical position of the backstop the upper end of the backstop is raised and lowered by a hydraulic cylinder and piston structure for proper cooperation with the back of the truck.

Another object is to provide a backstop having a first portion pivoted to the frame of the truck supporting platform and a second portion slidable within the first portion which when the backstop is swung to a vertical upright position constitutes the upper end of the backstop which cooperates with the back of the truck, and wherein the hydraulic cylinder and piston structure for raising and lowering the upper end of the backstop is positioned within the backstop between means carried by the first portion of the backstop and the second portion of the backstop.

Another object is to provide a structure wherein the hydraulic cylinder and piston structure for swinging the backstop to its vertical upright position is positioned within the truck supporting platform and acts between the frame of the truck supporting platform and the backstop.

Another object is to provide a structure wherein the hydraulic cylinder and piston structure for raising and lowering the upper end of the backstop when in vertical position is disposed longitudinally within the backstop, and the hydraulic cylinder and piston structure for swinging the backstop from its horizontal position within the frame of the truck supporting platform to a vertical position is disposed angularly between the first portion of the backstop and the truck supporting platform.

Further features and numerous advantages and adaptations of the invention will be apparent from the following detailed description taken in connection with the accompanying drawings, it being understood that the invention is limited only within the scope of the appended claims and not to the particular embodiment selected for illustration.

In the drawings:

FIGURE 1 is a side elevational view illustrating the improved truck unloading apparatus of the present invention with certain parts in section and showing a truck or truck trailer in position on the truck supporting platform;

FIGURE 2 is a fragmentary sectional view of the pivoted end of the truck supporting platform showing the backstop in horizontal position within the platform and also showing in dotted lines the backstop in its upright or vertical position; and FIGURE 3 is a sectional view through the truck supporting platform taken along the line 3—3 of FIGURE 1 and showing the means operable when the back of the truck is engaged by the upper portion of the workstop for tilting the platform with the truck thereon about the pivot for the platform to discharge the content of the truck from the back thereof.

The truck unloading apparatus selected for illustration is particularly adapted for unloading grain and/or other free flowing bulk materials from trucks and trailer trucks, but may be used for unloading wood chips, chemicals, soda ash, sugar cane, metal scrap, and other materials from trucks, or truck trailers.

As shown in the drawings, the truck, or truck trailer supporting platform 10 is pivoted in the vicinity of one end on a pivot 12 carried, for example, by the concrete hopper 14. The platform 10 is of rectangular form having, as shown in FIGURE 3, two parallel longitudinal I beams 16 suitably joined together and braced by transverse I beams 18 with longitudinal I beams 20 extending across the tops of the transverse I beams 18. A platform or truck supporting deck 22 is positioned over and attached to the I beams 16 and 20; the assembly forming a rigid structure.

The truck or truck trailer 24 has wheels 26 which are moved over and supported on the truck supporting platform 10 and particularly on the truck supporting deck 22 as shown in FIGURE 1. The platform 10 may be provided with an axle hold down 28, particularly where the truck is in the form of a truck trailer. The back of the truck 24 has door means at 30 which is adapted to be opened to discharge the contents of the truck from the back of the truck when the platform is tilted about its pivot 12 as will hereinafter appear.

The platform 10 in its horizontal position as shown in FIGURE 1 is supported, for example, on concrete supports 32, 34, 36 and 38. A concrete wall at 39 enables the truck, or truck trailer 24 to be driven on to the platform 10 and to be driven off of the platform 10, for example, to a roadway.

Near the pivoted end 12 of the platform 10 is a backstop 40 having a first portion 42 pivoted at 44 to the frame of the platform 10. The backstop 40 has a second portion 46 which is slidable in the first portion 42. The second portion 46 has end members 48 which when the backstop is in vertical or upright position as shown in dotted lines in FIGURE 2 constitutes the upper end of the backstop and is adjustable vertically as will hereinafter appear. In its horizontal position, as shown in FIGURE 2, the backstop 40 is positioned within the structure of the platform 10 with the portion 42 resting upon a support 50 carried by the frame of the platform structure 10. Another support for the backstop is shown at 52.

The backstop 40 comprising the first portion 42 and the second portion 46 is swung from the horizontal position to a vertical or upright position as shown in dotted lines in FIGURE 2 by a hydraulic cylinder and piston structure 54. The cylinder 56 of the hydraulic cylinder and piston structure 54 is pivoted, for example, at 58 to the main frame of the platform structure 10, and the piston 60 is pivoted, for example, at 62 to a lug 64 on a member 66 joined to the first portion 42 of the backstop. Hose, or other suitable connections 70, supply the cylinder 56 with hydraulic fluid for raising the backstop to its vertical position, and for lowering the backstop to its horizontal position.

In its vertical position the second portion 46 of the backstop and the upper end members 48 are adjustable vertically to provide the desired cooperation with the desired portion 72 of the back of the truck 24, which will vary in different trucks, by a hydraulic cylinder and piston structure 74. One end of the cylinder 76 of the hydraulic cylinder and piston structure 74 is pivoted at 78 to a lug 80 carried by a member 82 joined to the first portion 42 of the backstop. The piston 84 of the hydraulic cylinder and piston structure 74 is pivoted at 86 to a lug 88 on the lower end member 48 of the backstop.

The cylinder 76 passes through and is supported in an opening 90 in a member 92 joined to the first portion 42 of the backstop. A hose, or other suitable connection 94 supplies the cylinder 76 with hydraulic fluid for raising the upper end of portion 46 of the backstop, namely the upper end members 48, for the desired cooperation with the back of the truck at 72, the position of which will vary in different trucks. The upper end of the portion 46 may be lowered by exhausting the hydraulic fluid from the cylinder 76, or by a second hose, or other suitable connection.

With the upper end 48 of the portion 46 of the backstop adjusted vertically for proper cooperation with the back of the truck at 72 and with the door means 30 of the truck open, the truck platform is tilted from its horizontal position, for example, to the position shown in dotted lines in FIGURE 1 to discharge the contents of the truck from the back thereof by a hydraulic cylinder and piston structure. The platform and truck tilting hydraulic cylinder and piston structure comprises two telescoping sleeve cylinder means having four sleeve cylinder means 98, 100, 102 and 104. The lower sleeve cylinder means 96 are pivoted at 105 on a bottom portion 106 of the installation, and the upper sleeve cylinder means 104 are pivoted at their upper ends at 108 to lugs 110 on the bottom of the platform structure 10. The lower sleeve cylinder means 96 have hose connections 112 for supplying hydraulic fluid for extending the cylinders and tilting or swinging the platform 10 with the truck 24 thereon from its horizontal position, for example, to the position shown in dotted lines in FIGURE 1. Movement of the platform structure 10 with the truck 24 thereon from its tilted position to its horizontal position may be accomplished by exhausting the hydraulic fluid from the lower sleeve cylinder means 96.

The bottom portion 106 is disposed in a pit beneath the platform structure 10 but this may vary within the scope of the present invention. The platform structure 10 has stop means 114, as illustrated in FIGURE 2, which cooperates with the first portion 42 of the backstop and stops the backstop in its upright or vetrical position as shown in dotted lines in FIGURE 2.

The use and operation of the invention are as follows:

The truck or truck trailer 24 is moved into position upon the platform 10, as shown in FIGURE 1. The backstop 40 is swung about its pivot 44 to upright or vertical position against the stop 114 by the hydraulic cylinder and piston structure 54. The hydraulic cylinder and piston structure 74 is then operated to extend the upper portion 48 of the first portion 42 of the backstop into the desired position for engagement with the desired portion 72 of the back of the truck 30.

With the upper portion 48 of the backstop properly cooperating with the back of the truck at 72 and the door 30 opened the tilting hydraulic cylinder and piston structures are then operated to tilt the platform 10 with the truck 24 thereon from its horizontal position, for example, to its tilted position as shown in dotted lines in FIGURE 1 to discharge the contents of the truck from the opening in the back thereof. The hydraulic cylinder and piston structure 74 provides for extending the upper end members 48 of the second portion 46 of the backstop different amounts for cooperation, for example, with the desired portion 72 of the back of the truck 24 the position of which will vary in different trucks.

After the contents are discharged from the truck the platform structure 10 is returned to its horizontal position as shown in full lines in FIGURE 1. The truck, or truck trailer may then be driven from the platform structure 10, for example, over the wall 39 and to a roadway, or wherever else desired. After the truck or truck trailer is driven off of the platform 10 the platform is ready to receive aonther truck or truck trailer.

The embodiment of the invention disclosed in the drawings and specification is for illustrative purposes only, and it is to be expressly understood that said drawings and the specification are not to be construed as a definition of the limits or scope of the invention, reference being had to the appended claims for that purpose.

I claim:

1. Truck unloading apparatus comprising, in combination, a tilting truck supporting platform pivoted in the vicinity of one end, means for tilting said platform with the truck thereon about the pivot for said platform, a backstop having a first portion pivoted to said platform and having a horizontal position within said platform, a first hydraulic cylinder and piston structure operable to swing said backstop from its horizontal position to a vertical position extending upwardly from said platform, said backstop having a second portion constituting the upper end of said backstop when in vertical position, and a second hydraulic cylinder and piston structure positioned within said backstop and operable to raise and lower second portion of said backstop from said first portion of said backstop for proper cooperation with the backs of different trucks.

2. Truck unloading apparatus according to claim 1, wherein the truck supporting platform has stop means cooperating with said backstop for stopping said backstop in its vertical position as it is swung to that position by said first hydraulic cylinder and piston structure.

3. Truck unloading apparatus according to claim 1, wherein the second portion of said backstop has a portion slidable in a portion of said first portion of said backstop.

4. Truck unloading apparatus according to claim 1, wherein the second hydraulic cylinder and piston structure acts between means carried by said first portion of said backstop and said second portion of said backstop.

5. Truck unloading apparatus according to claim 1, wherein the first hydraulic cylinder and piston structure acts between the frame of said truck supporting platform and said first portion of said backstop.

6. Truck unloading apparatus according to claim 1, wherein the means for tilting the platform with the truck thereon about the pivot for said platform comprises plural sleeve telescoping cylinder means operating between the bottom of the truck supporting platform and a bottom portion of the installation.

7. Truck unloading apparatus according to claim 1, wherein there is an axle hold down on the truck supporting platform.

8. Truck unloading apparatus comprising, in combination, a tilting truck supporting platform pivoted in the vicinity of one end, a backstop having a vertical position extending upwardly from said platform adjacent its pivoted portion, said backstop having a lower portion and an upper portion, means for raising and lowering said upper portion of said backstop from said lower portion of said backstop for proper cooperation of said upper portion of said backstop with the backs of different trucks, and means operable when the back of the truck is engaged by the upper portion of said backstop for tilting said platform with the truck thereon about the pivot for said platform to discharge the contents of the truck from the back thereof.

9. Truck unloading apparatus according to claim 8, wherein the means for raising and lowering said upper portion of said backstop from said lower portion of said backstop comprises a hydraulic cylinder and piston structure.

10. Truck unloading apparatus according to claim 8, wherein the means operable when the back of the truck is engaged by the upper portion of said backstop for tilting said platform with the truck thereon about the pivot for said platform to discharge the contents of the truck from the back thereof comprises plural sleeve telescoping cylinder means operating between the bottom of the truck supporting platform and a bottom portion of the installation.

11. Truck unloading apparatus according to claim 8, wherein the truck supporting platform in its horizontal position is supported on supports and the means operable when the back of the truck is engaged by the upper portion of said backstop for tilting said platform with the truck thereon about the pivot for said platform to discharge the contents of the truck from the back thereof is disposed in a pit beneath the truck supporting platform.

12. Truck unloading apparatus comprising, in combination, a tilting truck supporting platform pivoted in the vicinity of one end, a backstop having a vertical position extending upwardly from said platform adjacent its pivoted portion, said backstop including an axially extensible upper end portion for engaging the back of a truck when disposed on said supporting platform to prevent rearward movement of the truck, and means for effecting coaxial adjustment of the upper end of said backstop for proper cooperation with the backs of different trucks, said means being operative independently of engagement of said backstop with the back of a truck.

13. Truck unloading apparatus as defined in claim 12 wherein said means for effecting coaxial adjustment of the upper end of said backstop includes a hydraulic cylinder and piston arrangement.

14. Truck unloading apparatus according to claim 12 wherein said backstop is movable to a position lying within said truck supporting platform.

References Cited by the Examiner

UNITED STATES PATENTS

| | | | |
|---|---|---|---|
| 2,603,366 | 7/1952 | Adams | 214—49 |
| 2,834,486 | 5/1958 | Straight et al. | 214—55 |
| 3,075,660 | 1/1963 | Kelley | 214—49 |

GERALD M. FORLENZA, *Primary Examiner.*

ROBERT G. SHERIDAN, HUGO O. SCHULZ,
*Examiners.*